Patented July 6, 1954

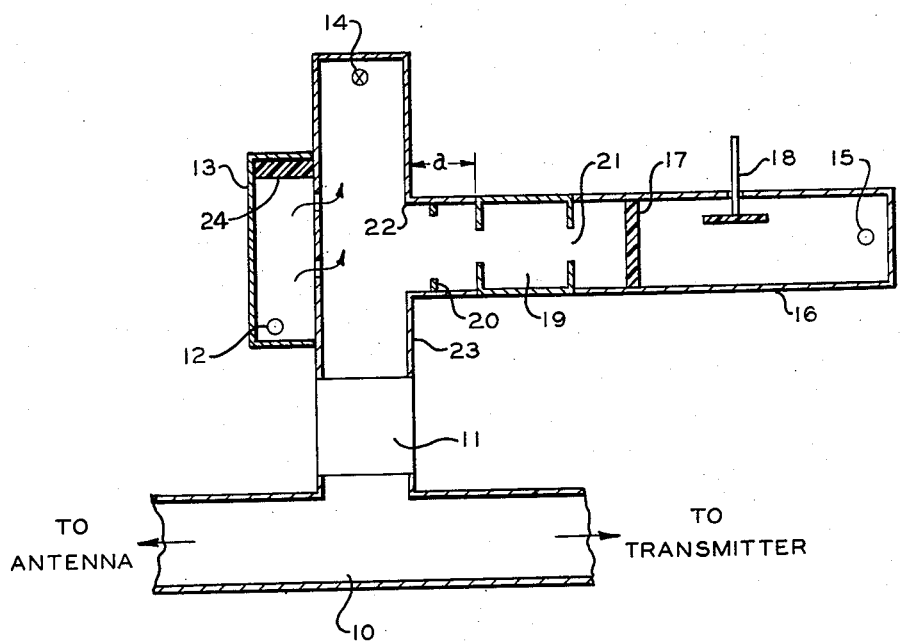

2,683,212

UNITED STATES PATENT OFFICE 2,683,212

RADAR-BEACON MIXER

Richard L. Best, Cambridge, Mass., assignor, by mesne assignments, to the United States of America as represented by the Secretary of the Navy Application December 27, 1945, Serial No. 637,424

4 Claims. (Cl. 250—13)

The present invention relates to the use of a cavity in coupling local oscillator power to a detector. More particularly it relates to the use of this cavity as a frequency monitor of the beacon local oscillator in a radar system.

In the circuit design of local oscillators for beacon and search reception in previously constructed radar systems two conditions prevailed. The first design was one in which one crystal was used for the detection of both search and beacon signals. This design, however, made no allowance for frequency monitoring of beacon local oscillator power. This is extremely important, for one of the most useful functions of a radar system is its ability to provide navigational aid to aircraft and to ships. To combat this situation a second design was conceived which took a sample of the radio frequency power in that portion of the wave guide, or coaxial line, near the crystal detector. This sample was coupled to a resonant cavity which was pre-tuned to the proper local oscillator frequency for beacon reception. To this cavity was also coupled another crystal detector, the current of which was consequently indicative of the relationship of the actual beacon local oscillator frequency to the resonant frequency of the reference, or beacon, cavity, i. e. maximum crystal current indicated that the energy of the sample was at the frequency of the reference cavity. The disadvantage of this structure was the fact that an additional crystal was required as well as the fact that a certain amount of wiring complexity was entailed in the switching of crystal current leads to the ammeter which was ordinarily mounted on the control panel.

Accordingly, it is an object of this invention to provide a device which will allow beacon local oscillator frequency monitoring.

Another object of this invention is to provide a device which will allow beacon local oscillator frequency monitoring by the use of the same crystal that is used for search signal and beacon signal detection.

A further object of this invention is to accomplish the two foregoing objects without interference with the ordinary functions of search signal and beacon signal reception.

These and further objects will be more readily apparent upon examination of the following description and the accompanying drawing which discloses one embodiment of this invention.

The design which allows the use of but one crystal for all functions is, in brief, the insertion of a resonant-pass filter between the beacon local oscillator and the detector crystal. The detector crystal current is then a measure of the frequency difference between the beacon local oscillator and the desired local oscillator frequency as established by the resonant frequency of the filter, i. e. maximum crystal current indicates that the beacon local oscillator is tuned to the resonant frequency of the filter.

The drawing presents a partially cross-sectional view of the essentials of the radio frequency components of the detecting circuit of a radar system employing one embodiment of the present invention. Duplexer 10 couples the detecting circuit to the antenna and also to the transmitter since this embodiment is a single antenna system. Included in the duplexing action is T-R (transmit-receive) box 11 which protects the detecting circuit from transmitted pulses in a manner well-known to those skilled in the art. T-R box 11 is broad-banded to permit both beacon and radar frequencies, which are different, to be passed without any tuning adjustments being required. The use of a broad-banded T-R box necessitates the use of a directional coupler 13. Probe 12 of the search local oscillator is inserted in directional coupler 13, which insures the transmission of the most of the search local oscillator power to crystal 14, thus preventing loss of search local oscillator power through T-R box 11 in the direction of duplexer 10. Local oscillator power flows in the direction of the arrows. A first resistance 24 is placed at the end of directional coupler 13 opposite that where probe 12 is inserted in order to provide a matched load for the local oscillator and may comprise a solution of colloidal graphite coated on a dielectric backing. Probe 15 of the beacon local oscillator is inserted in wave guide 16. A second resistance 17 is inserted across wave guide 16 to provide a load for the beacon local oscillator, and may similarly comprise a solution of colloidal graphite coated on a dielectric backing. Attenuator 18 may also be a colloidal graphite coated on a dielectric backing. It controls the amount of beacon local oscillator power which may pass down wave guide 16 by adjustment of its position within wave guide 16, absorbing more or less power as its position approaches the center or the edge of the guide respectively. Cavity 19 is tuned to the proper local oscillator frequency for beacon signal reception and is inserted in wave guide 16 in order that only the proper local oscillator frequency may be fed to crystal 14 during beacon signal reception. Iris 20 is inserted to match the impedance of the wave guide system to the left of point 22 to the characteristic impedance of wave guide 16, for which impedance cavity 19 is designed. Iris 20 is especially important since the impedance of the radio frequency system to the left of point 22 must be made to look like a pure resistance to reference cavity 19, for any reactive component of the above-mentioned impedance would alter the resonant frequency of cavity 19 and thus limit its usefulness as a frequency monitor.

The electrical action of this radio frequency circuit includes the following points. Cavity 19, when off-resonance, offers a short circuit at entrance point 21. Resistance 17, which has been placed approximately a quarter wave length from cavity entrance 21 so that the effect of the short circuit at cavity entrance 21 will be that of an infinite impedance in parallel with resistance 17, hence constitutes the effective load of the beacon local oscillator. Since iris 20 has matched the radio frequency system to the left of point 22 to the characteristic impedance of wave guide 16, cavity 19, since it looks into this characteristic impedance, may be moved to any desirable distance $a$ from point 22. The distance $a$ is so chosen that the impedance at point 22 will be effectively zero to all incoming signals. This allows passage of both search and beacon return signals in wave guide 23 without attenuation.

The foregoing description has presented an explanation of this invention in the particular application of a beacon local oscillator frequency monitor, but the principles of this invention are of broader application in ways which will be apparent to those skilled in the art. It will be understood that the above-disclosed embodiment is primarily illustrative and that the invention includes such other embodiments as fairly come within the spirit and scope of the disclosure.

What is claimed is:

1. A radio frequency circuit for use with a first local oscillator and a second local oscillator, comprising, a transmit-receive switch, apparatus for conveying energy from both a transmitter and an antenna to said transmit-receive switch, a directional coupler, a probe associated with said first local oscillator for feeding said directional coupler, a first section of wave guide, a second probe associated with said second local oscillator for feeding said first section of wave guide, a resistor disposed in said first section of wave guide acting as a load for said second local oscillator, a cavity resonator disposed in said first section of wave guide on the side of said resistor opposite said second probe and receiving energy from said second probe, an iris mounted in said first section of wave guide at the side of said resonator opposite the side receiving energy from said second local oscillator, a second wave guide section, a crystal mount incorporated in said second wave guide section, a crystal mounted in said crystal mount, said directional coupler being coupled to said second wave guide section and directing energy from said first local oscillator in the direction of said crystal, said first wave guide section being coupled to said second wave guide section at the end of said first wave guide section at which said iris is mounted, whereby energy from said second local oscillator passes through said resonator and iris into said second wave guide section, said transmit-receive switch being coupled to said second wave guide section whereby energy received by said antenna is coupled into said second wave guide section and energy from said transmitter is prevented from entering said second wave guide section, whereby the current flowing through said crystal is a function of the frequency of said second local oscillator, said current being a maximum when the frequency of said second local oscillator is equal to the resonant frequency of said resonator.

2. Apparatus as in claim 1 wherein said iris is positioned within said first wave guide section a predetermined distance from said second wave guide section for matching the impedance presented to said first wave guide section at the junction of said first and second wave guide sections to the characteristic impedance of said first wave guide section.

3. Apparatus of claim 1 and attenuating means incorporated with said first wave guide section for controlling the amount of the second local oscillator power coupled from said first wave guide section into said second wave guide section.

4. Apparatus as in claim 1 wherein said resistor is located substantially one quarter wave length away from said cavity resonator at the frequency at which said cavity resonator is resonant.

References Cited in the file of this patent

UNITED STATES PATENTS

| Number | Name | Date |
| --- | --- | --- |
| 2,403,025 | Samuel | July 2, 1946 |
| 2,408,055 | Fiske | Sept. 24, 1946 |
| 2,408,420 | Ginzton | Oct. 1, 1946 |
| 2,413,963 | Fiske et al. | Jan. 7, 1947 |
| 2,422,190 | Fiske | June 17, 1947 |
| 2,432,100 | Kircher | Dec. 9, 1947 |
| 2,433,387 | Mumford | Dec. 30, 1947 |
| 2,445,445 | Marcum | July 20, 1948 |
| 2,505,534 | Fiske | Apr. 25, 1950 |